(12) United States Patent
Khanna et al.

(10) Patent No.: US 7,967,371 B2
(45) Date of Patent: Jun. 28, 2011

(54) MACHINE HAVING CAMERA AND MOUNTING STRATEGY THEREFOR

(75) Inventors: Kunaal Khanna, Chicago, IL (US); Rahul Visal, Hanover Park, IL (US); Craig B. Kelley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1134 days.

(21) Appl. No.: 11/725,886

(22) Filed: Mar. 20, 2007

(65) Prior Publication Data

US 2008/0231744 A1 Sep. 25, 2008

(51) Int. Cl.
*B62D 39/00* (2006.01)

(52) U.S. Cl. ............... 296/187.01; 340/937; 348/148

(58) Field of Classification Search .............. 340/435, 340/436, 903, 937; 348/148, 113
See application file for complete search history.

(56) References Cited

U.S. PATENT DOCUMENTS

| | | | |
|---|---|---|---|
| 4,277,804 A | 7/1981 | Robison | |
| 4,420,238 A | 12/1983 | Felix | |
| 4,514,068 A | 4/1985 | Urquhart | |
| 4,615,597 A | 10/1986 | Burriss | |
| 5,260,731 A | 11/1993 | Baker, Jr. | |
| 6,111,498 A | 8/2000 | Jobes et al. | |
| 6,175,300 B1 | 1/2001 | Kendrick | |
| 6,315,180 B1 | 11/2001 | Watkins | |
| 6,762,790 B1 | 7/2004 | Matko et al. | |
| 7,265,656 B2 * | 9/2007 | McMahon et al. | ............ 340/435 |
| D577,050 S * | 9/2008 | Dayan | .......................... D16/219 |
| 7,511,607 B2 * | 3/2009 | Hubbard et al. | ............... 340/435 |
| 7,605,692 B2 * | 10/2009 | Yamada et al. | ................ 340/438 |
| 7,697,027 B2 * | 4/2010 | McMahon et al. | ............ 348/148 |
| 7,726,434 B2 * | 6/2010 | Pochmuller | ................... 180/281 |
| 2004/0036768 A1 | 2/2004 | Green | |
| 2004/0119881 A1 | 6/2004 | Matko et al. | |
| 2005/0040939 A1 | 2/2005 | Jobes et al. | |
| 2005/0128294 A1 | 6/2005 | Green et al. | |
| 2010/0073479 A1 * | 3/2010 | Uto et al. | ....................... 348/148 |
| 2010/0204873 A1 * | 8/2010 | Lee | ................. 701/29 |

FOREIGN PATENT DOCUMENTS

| JP | 10140619 A | * | 5/1998 |
|---|---|---|---|
| JP | 2006016914 A | * | 1/2006 |
| JP | 2006336361 A | * | 12/2006 |

OTHER PUBLICATIONS

Employee of Assignee; Photos of Machine taken prior to Jan. 1, 2006; 5 pp.
Volvo Wheel Loader L150E; published prior to Dec. 31, 2005; 8 pp.

* cited by examiner

*Primary Examiner* — H Gutman
(74) *Attorney, Agent, or Firm* — Liell & McNeil

(57) ABSTRACT

A machine includes a frame having ground engaging elements for propelling a machine, and a body mounted to the frame. The body includes a plurality of body components, one of which is contoured for mounting a camera that includes a continuous face and a pocket each formed in an outer surface thereof. The method of assembling a machine includes molding a unitary body component for machine body, the body component having an outer surface with a continuous face and a pocket. The method further includes mounting a camera within the pocket and establishing an electrical link between the camera and an electrical system of the machine via a port disposed in the pocket which extends through the outer surface.

12 Claims, 5 Drawing Sheets

MACHINE HAVING CAMERA AND MOUNTING STRATEGY THEREFOR

TECHNICAL FIELD

The present disclosure relates generally to machines having cameras mounted thereon and related camera-mounting strategies. More particularly, the present disclosure relates to a machine, camera mount and machine assembly method wherein a body component contoured for mounting a camera is coupled with a machine body.

BACKGROUND

Mobile machines having cameras mounted thereon have been known for many years. Cameras and camera mounting systems for recreational vehicles, utility vehicles such as armored cars, and even certain sports cars, for example, are commercially available. Likewise, automobile-mounted camera systems have long been used by private investigators and law enforcement personnel. In some instances, it may be desirable to view areas with a camera not otherwise visible to an operator. In others situations, data acquisition, surveillance or security are the primary motivation for such cameras.

In the case of machines used in construction, mining, forestry and similar industries, in recent years cameras have become increasingly desirable, or mandatory, to enable an operator to view parts of the machine and the work area around the machine which are otherwise out of the operator's field of view. Evolutionary changes in machine design have eroded the field of view that was available to operators on some older machine models, and cameras are attractive for restoring or maintaining the field of view. In addition, regulations which define the minimum field of view available to an operator have become more stringent in recent years, and cameras are increasingly employed to meet those regulations.

Wheel loaders are one example where changed machine design and operator visibility regulations have increased the use of cameras. Some manufacturers mount an external, rear-view camera on wheel loaders, and a display screen in the operator cab to permit an operator to view areas behind the machine. As alluded to above, more stringent operator visibility regulations have increased the area around a wheel loader which the operator must be able to view. At the same time, changes in emissions requirements have resulted in increased hood height to accommodate thermal management and filtering equipment within the engine compartments of some wheel loaders. Operators may thus now be required to have a relatively greater field of view than in the past, while changes in machine design have made this all the more challenging to accomplish.

One common system for viewing areas behind a wheel loader employs a camera positioned on a mounting bracket extending from the rear hood. During operation, an operator can view a display screen in the cab which shows the camera view behind the machine. A portion of the area immediately behind the machine is then visible to the operator on the display screen, and typically parts of the machine are also visible on the display screen to serve as reference points. A shortcoming of such a mounting system is that the camera is exposed and stands proud of the machine's profile. In such a position the camera risks damage from debris, or may be harmed by rain or dust. In addition, the camera itself becomes another impediment to the operator's view towards the rear of the machine, and detracts from the appearance of the machine. One manufacturer has mounted a rear view camera immediately behind the vertical radiator grill at the rear of the machine, with the camera extending through a gap in the grill. This latter mounting strategy positions the camera substantially in the air flow created by the radiator cooling fan. Cameras mounted in this manner may also be easily tampered with, as their mounting hardware is often accessible from outside the machine. Even in the more elegant of the various designs, the camera and mounting hardware tends to be unsightly and camera mounting still requires undesired assembly steps and hardware.

The present disclosure is directed to one or more of the problems or shortcomings set forth above.

SUMMARY OF THE DISCLOSURE

The present disclosure describes a machine having a frame with a plurality of ground engaging elements mounted thereto which are configured for propelling the machine and a body mounted to the frame. The body includes a plurality of body components each configured to cover a portion of the machine. A camera is further provided which is mounted on the machine. One of the body components includes a contoured outer surface for mounting the camera, the contoured outer surface including a continuous face and a pocket. The pocket is at least partially surrounded by and adjoins the continuous face and partially encloses the camera. The pocket further includes at least one camera mounting surface whereupon the camera is mounted.

The present disclosure also describes a method of assembling a machine including molding a unitary body component for a machine body, the body component having an outer surface contoured for mounting a camera on the machine. The outer surface includes a continuous face and a pocket at least partially surrounded by and adjoining the continuous face. The method further includes mounting a camera to a portion of the outer surface within the pocket such that the pocket partially encloses the camera, and coupling the body component with a machine frame, including covering a portion of the machine. The method still further includes establishing an electrical link between the camera and an electrical system of the machine via a port disposed in the pocket and extending through the outer surface.

The present disclosure also describes a camera mount for a machine. The camera mount includes a unitary molded body component configured for coupling with a mobile machine and having an outer surface contoured to support a camera at an exterior location on the machine when coupled therewith. The body component further includes an inner surface and the outer surface includes a continuous face with a height and a width greater than the height. The outer surface further includes a pocket for mounting a camera therein which is at least partially surrounded by and adjoins the continuous face and is at least partially recessed relative to the continuous face. The pocket includes at least one camera mounting surface for mounting a camera thereon.

DETAILED DESCRIPTION

Figure 1:
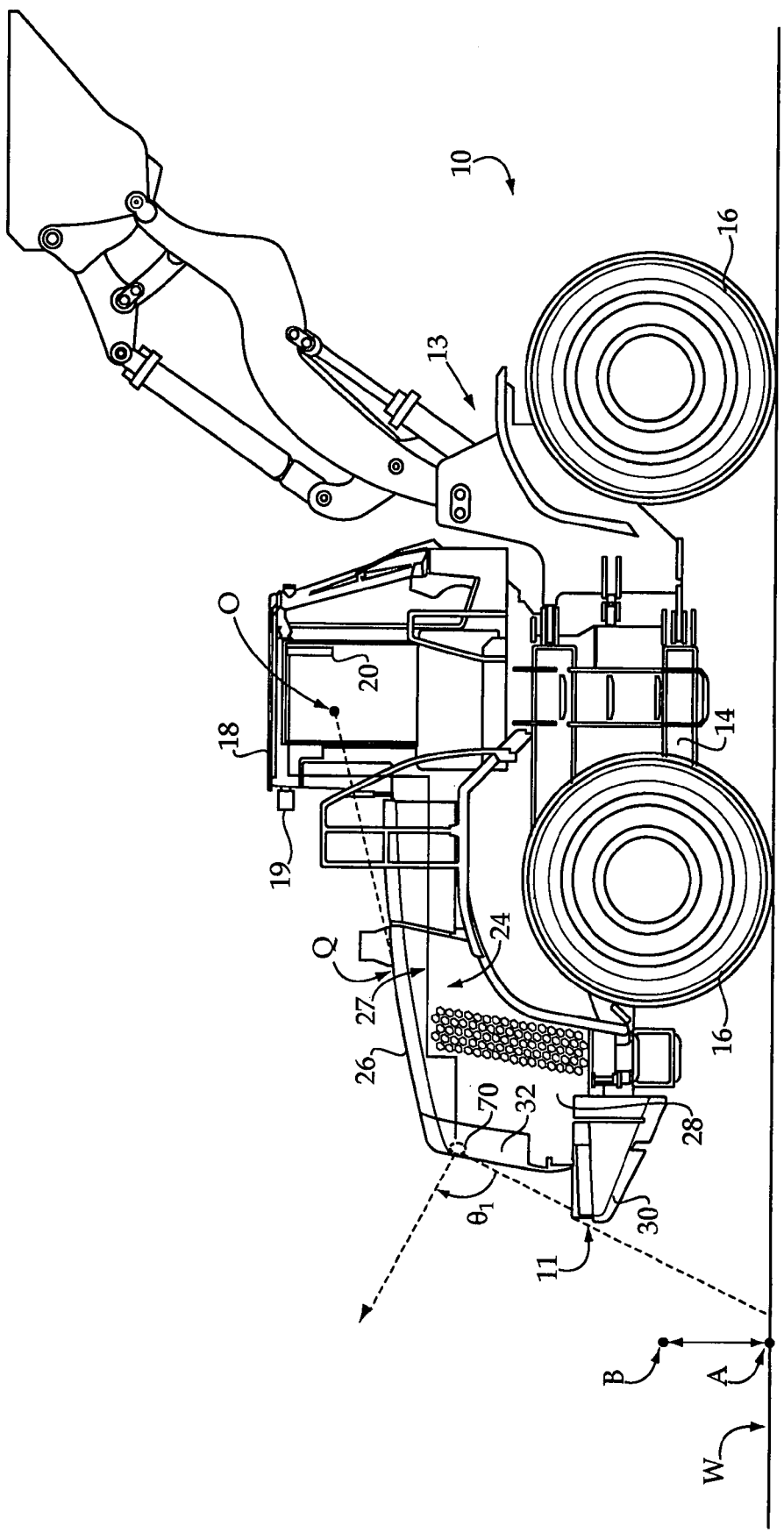
FIG. 1 is a side diagrammatic view of a machine according to one embodiment.

Referring to FIG. 1, there is shown a side view of a machine 10 according to the present disclosure. Machine 10 is depicted as a wheel loader, having front and back sets of ground engaging elements such as wheels 16. The present disclosure shall be explained by making exemplary reference to its application on a wheel loader. However, the application of the present disclosure is not limited to wheel loaders. Those of ordinary skill in this art will be able to apply the present disclosure to other machines such as track-type machines, trucks, motor graders and many others. Machine 10 may include a camera 70, for example a rearview camera, configured for viewing areas behind machine 10. In other embodiments, or with other machine types, camera 70 might be configured for viewing to the front, or some other direction from machine 10. Camera 70 will typically be coupled with an electrical system 24 of machine 10 and configured to transmit data to a display screen 20 mounted in an operator cab 18. In other embodiments, however, rather than providing a display, camera 70 could be used simply as a video recording device. Whatever the specific application, the present disclosure is contemplated to provide substantial technical as well as aesthetic advantages over known methods of camera mounting and use in mobile machines.

Machine 10 may include a frame 14 to which wheels 16 are mounted and a plurality of body components, for example a movable hood 26 and a plurality of side panels 28, together providing an enclosure 27 defining an engine compartment for machine 10. Hood 26 may be movable for accessing the engine compartment within enclosure 27. A bumper 30 may be positioned at a back end 11 of machine 10 opposite a front end 13 thereof. In one embodiment, camera 70 will be positioned such that it provides a field of view having a vertical viewing angle $\theta_1$ of about 86° as shown in FIG. 1. Camera 70 may also be mounted such that its vertical viewing angle includes a portion of bumper 30. The field of view of camera 70 may also include a first location on a work surface W about 1.5 meters behind back end 11 of machine 10, shown via point A in FIG. 1. The field of view of camera 70 may still further include a point B that is vertically above point A by about 1.0 meters. Certain regulatory requirements may provide that point A and point B, as well as portions of machine 10, should fall within the field of view of camera 70.

In one embodiment, camera 70 will be mounted such that its field of view includes regions of work surface W which are not within a field of view of an operator from within cab 18. In particular, depending upon the machine configuration, an operator field of view may be limited by hood 26, particularly in machine designs wherein hood height is increased as compared to earlier machine configurations. When an operator is seated within cab 18, the operator may have a limited view toward the rear of machine 10. Where an operator attempts to look rearward and downward from cab 18 from approximately a point 0, the operator's visibility may be blocked by a high point in hood 26, shown in FIG. 1 at point Q. Accordingly, cameras mounted according to the present disclosure can enable enhanced visibility rearward of machine 10, certainly as compared to machines having no camera, and in many instances better than what would be available with conventional camera mounts on top of hood 26 or many other places on machine 10.

Figure 2:
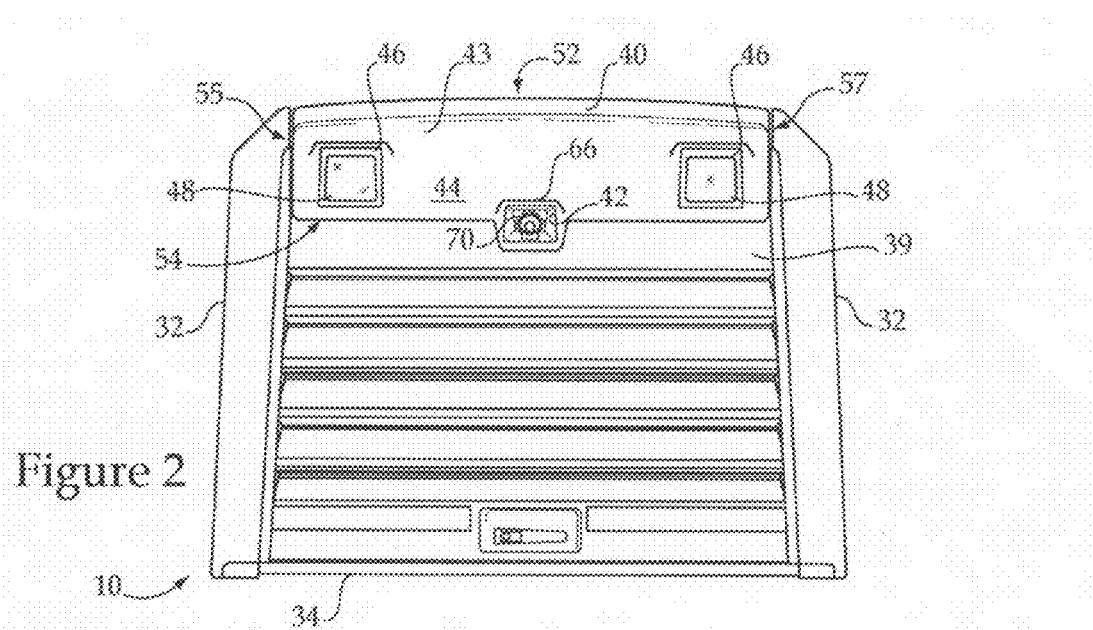
FIG. 2 is a partial back view of the machine of FIG. 1.

Referring also now to FIG. 2, there is shown a partial back view of machine 10, illustrating a grill 34 configured to permit air flow into a radiator and/or into enclosure 27. Positioned about grill 34 are a plurality of body components, including first and second vertical trim pieces 32, and a horizontal trim piece 40 extending along an upper edge 39 of grill 34. Each of the body components shown in FIG. 2, as well as body components 26 and 28 of FIG. 1, may be configured to cover portions of machine 10. In the case of panels 28 and hood 26, portions of frame 14 and an engine system (not shown) might be covered. With regard to trim pieces 32 and 40, they may cover portions of grill 34. Horizontal trim piece 40 may be contoured for mounting camera 70 via the shape of an outer surface 43 thereof. Outer surface 43 may include a continuous face 44 extending between a top edge 52 and a bottom edge 54.

Horizontal trim piece 40 may be contoured for mounting camera 70 via the shape of an outer surface 43 thereof. Outer surface 43 may include a continuous face 44 extending substantially between top edge 52 and bottom edge 54, and substantially between a left edge 55 and a right edge 57, constituting a majority of outer surface 43. Continuous face 44 may be substantially planar and configured for displaying a logo or the like. Face 44 may thus have a width greater than its height. First and second receptacles, each numbered 46, for mounting camera lights 48 may also be positioned in trim piece 40 and might comprise inwardly extending regions of outer surface 43, or they might simply comprise holes cut in trim piece 40 or brackets or the like mounted thereon. In the embodiment shown in FIG. 2, lights 48 are included to provide light for camera 70 in low light conditions. Machine 10 may also be equipped with standard lights such as back-up lights 19 mounted to cab 18, one of which is shown in FIG. 1.

Outer surface 43 of trim piece 40 may further include a pocket 42 adjoining face 44, for mounting camera 70 therein. As mentioned above, outer surface 43 may be contoured for mounting camera 70. Each of the features of trim piece 40 visible in FIG. 2 may be understood to be parts of outer surface 43, and each created during a molding process therefor, further described herein. Accordingly, the "contour" of outer surface 43 refers to its shape formed during molding. As alluded to above, by virtue of the contour of outer surface 43, technical and aesthetic advantages in mounting camera 70 will be available with trim piece 40.

Figure 3:
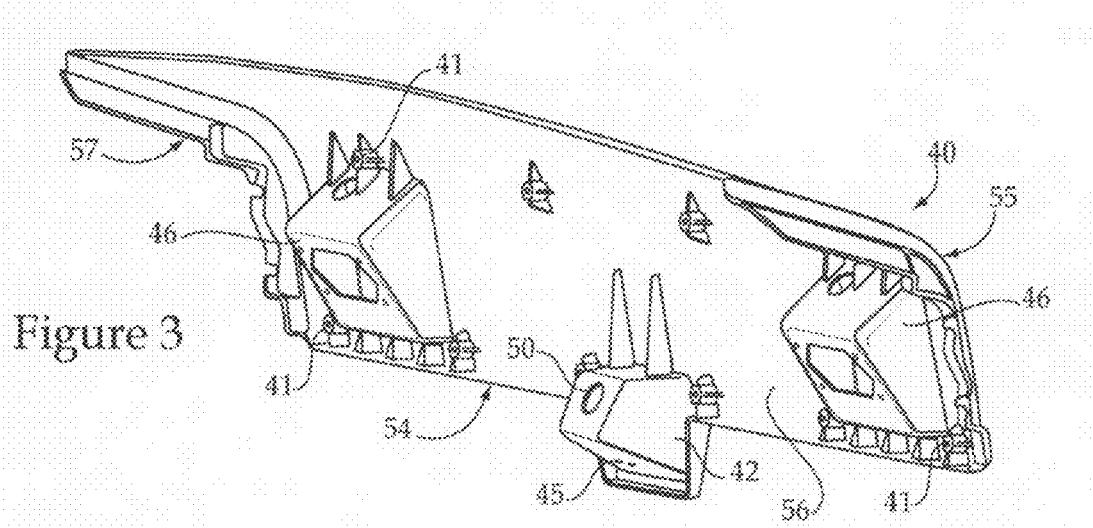
FIG. 3 is a back perspective view of a body component according to one embodiment.

Pocket 42 may be formed integrally with trim piece 40 during manufacturing. In one embodiment, trim piece 40 may comprise a unitary, molded one-piece plastic body having all or nearly all of its respective features formed during molding, as described above. Referring also to FIG. 3, there is shown a back perspective view of trim piece 40, illustrating an inner or back surface 56, mounting elements 41, which might or might not consist of molded features, each of receptacles 46 and pocket 42. Adhesives, fasteners and any other suitable means such as snap-fitting may be used to mount trim piece 40 on machine 10. Each of pocket 42 and receptacles 46 may protrude outwardly from back surface 56, leftward and out of the page in the FIG. 3 illustration. Pocket 42 may also extend downwardly from bottom edge 54 and be positioned such that a line defined by bottom edge 54 intersects pocket 42.

As shown in FIG. 2, pocket 42 may cover a portion of grill 34 when trim piece 40 is coupled with machine 10. In other embodiments, pocket 42 could be positioned wholly inwardly of edges 52 and 54. An electrical communication port 50 may be located in pocket 42 such that an electrical connection such as a power cable or a data link from camera 70 may extend through outer surface 43, and hence all of trim piece 40, to connect with electrical system 24. Port 50 could be formed during molding trim piece 40, or it might simply be drilled or punched when camera 70 is assembled therewith. Holes 45 may also be provided in pocket 42 for mounting camera 70, as further described herein.

Figure 4:
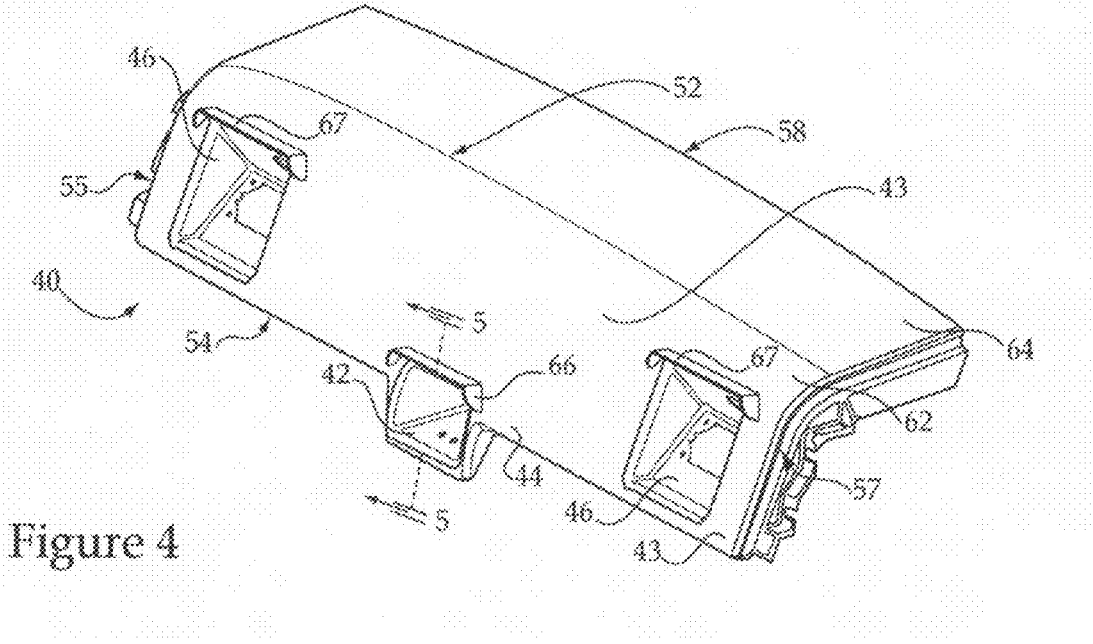
FIG. 4 is a front perspective view of a body component according to one embodiment.

Turning now to FIG. 4, there is shown a front perspective view of trim piece 40, rotated approximately 180° from the view shown in FIG. 3. It will be noted that trim piece 40 may include a curving or angled profile between bottom edge 54 and a back edge 58. Trim piece 40 may include an upper portion 64 configured to extend along a back top end 29b of hood 26, shown in FIG. 7, and oriented more or less horizontally when trim piece 40 is coupled with machine 10. A lower portion 62 may curve downwardly from upper portion 64 such that it is more or less oriented vertically when trim piece 40 is coupled with machine 10, and is configured to extend along upper edge 39 of grill 34. Receptacles 46 and pocket 42 may be positioned in lower portion 62. Pocket 42 may be at least partially recessed, and may be completely recessed relative to face 44. While the general configuration for trim piece 40 shown in FIG. 4 is contemplated to provide one practical implementation strategy, it should be appreciated that the present disclosure is by no means thereby limited. For instance, rather than separate vertical trim pieces 32 and a horizontal trim piece 40, all of the plastic molded framework that fits around and partially covers grill 34 might be one piece. Further, rather than the curved/angled profile having both upper and lower portions 64 and 62, trim piece 40 might comprise an essentially flat panel. Further still, in embodiments where a trim piece contoured for supporting a camera is used at a different location on a machine, wide variation from the configuration shown in FIG. 4 would be possible without departing from the scope of the present disclosure.

Also shown in FIG. 4 is a visor 66 configured to shield a camera positioned in pocket 42 from debris, water running down under the force of gravity, etc. Visor 66 may also comprise a part of outer surface 43 and be molded integrally therewith. An integrally molded visor provides a robust means for protecting a camera, without requiring additional hardware or a component separate from trim piece 40. As water, bits of rock, dirt, etc., fall down on or otherwise strike trim piece 40, the water or debris will be inhibited by visor 66 from entering camera pocket 42. While visor 66 is illustrated as extending generally linearly across a top of pocket 42, other designs such as an arc shape, a V-shape or another design might be used. Visor 66 could also be positioned more remotely from pocket 52 than that shown. In still other instances, visor 66 might comprise a lip or other structure raised above a profile of face 44 sufficiently to inhibit water entering pocket 42. Thus, it will be appreciated that a wide variety of designs and styles for visor 66 will fall within the scope of the present disclosure. Additional visors 67, formed and configured generally similarly to visor 66 may be provided for each of receptacles 46, protecting lights mounted therein from debris, water, etc.

Figure 5:
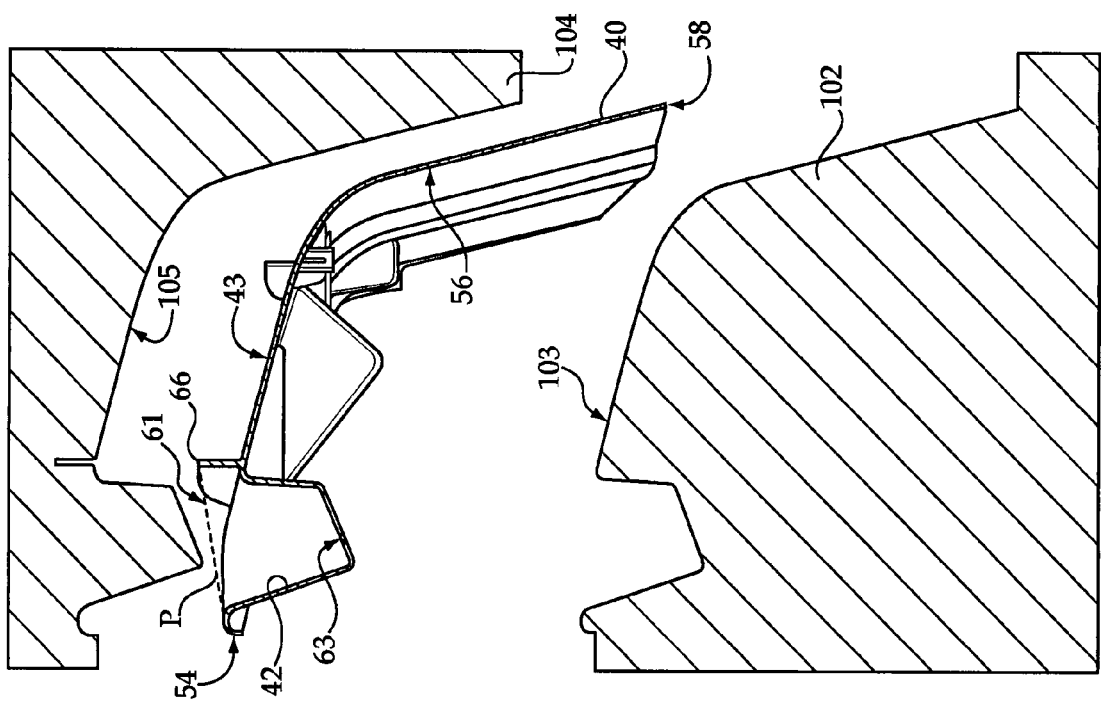
FIG. 5 is a sectioned view of a body component taken along line 5-5 of FIG. 4, shown positioned within a molding apparatus.

Referring also to FIG. 5, there is shown a sectioned view taken approximately along line 5-5 of FIG. 4, showing trim piece 40 positioned for removal from a mold. In the embodiment shown in FIG. 5, it will be noted that outer surface 43 is continuous from bottom edge 54 to back edge 58 of trim piece 40. It may also be noted that pocket 42 includes an open end 61, permitting camera 70 to view outwardly thereof, and a blind end 63 opposite open end 61. When positioned within pocket 42, camera 70 may be disposed on one side of a plane P extending across opening 61 and tangent to outer surface 43, such that camera 70 is completely enclosed in pocket 42, i.e. the profile of the camera does not project from outer surface 43. Positioning camera 70 as described helps minimize the risk that debris will damage or obscure camera 70, and avoids unsightly obstruction exterior to machine 10, as in certain earlier designs. Nor does camera 70, via the mounting strategy described herein, interfere with an operator's view should the operator attempt to actually view backward of the machine, rather than on a display device.

Figure 6:
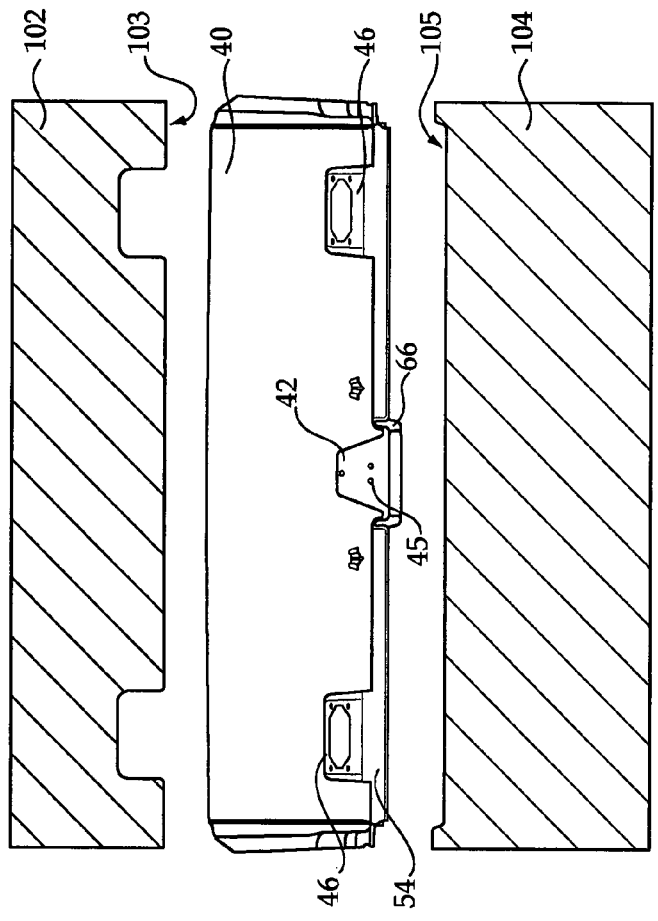
FIG. 6 is a bottom view of a body component according to one embodiment, also shown positioned within a molding apparatus.

All of the features of trim piece 40 may be formed via a single molding step, for example, positioning a single sheet of sheet molding compound between a first mold die 102 and a second mold die 104. Each of dies 102 and 104 may have a continuous die surface 103 and 105, respectively, corresponding to continuous outer surface 43 and continuous inner/back surface 56. Mold dies having continuous mold surfaces will enable molding trim piece 40 such that it can readily be removed after molding. In other words, in some embodiments, no moving dies or more than one splitline within the mold will be used, enabling relatively rapid and efficient molding of a plurality of trim pieces 40 for use on a plurality of machines. Referring to FIG. 6, there is shown another view of mold dies 102 and 104 with trim piece 40 positioned therebetween. In FIG. 6, the view is flipped upside down and rotated approximately 45° relative to the view shown in FIG. 5, approximately as trim piece 54 would appear when viewed edge-on relative to bottom edge 54.

Figure 7:
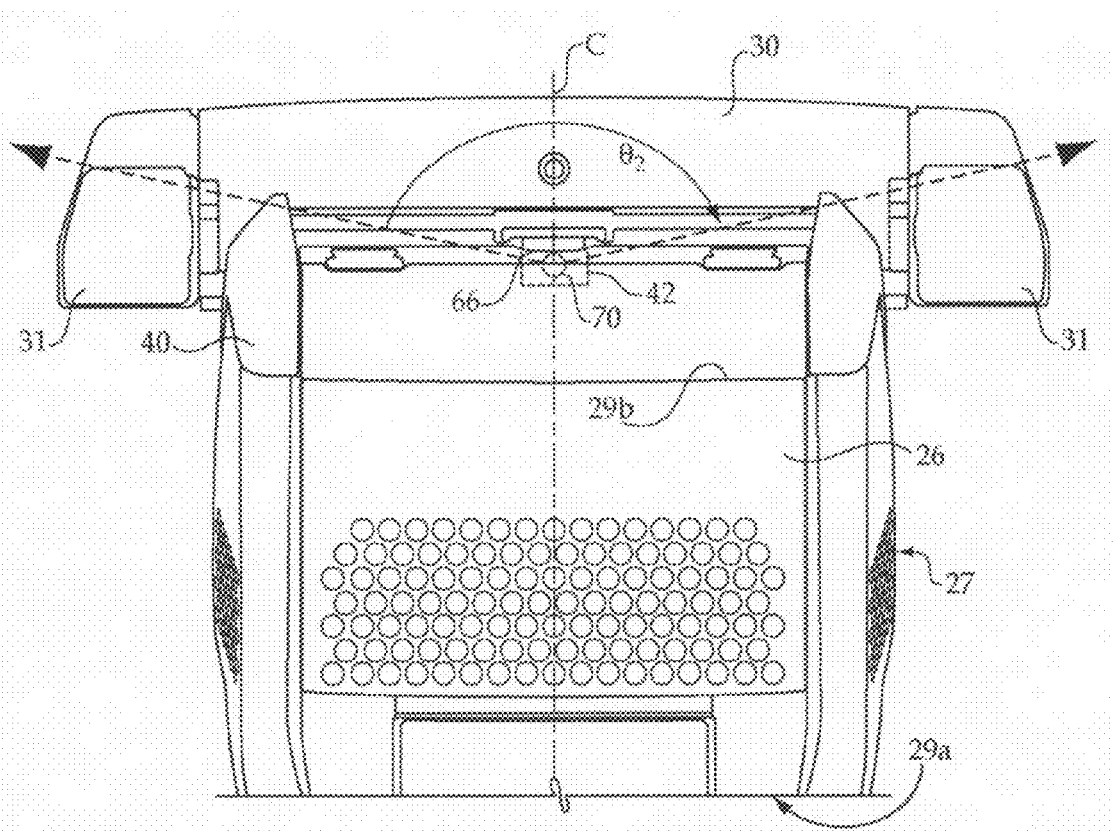
FIG. 7 is a partial top view of the machine of FIG. 1.

Turning now to FIG. 7, there is shown a partial top view of machine 10 wherein a horizontal viewing angle, $\theta_2$, of the field of view of camera 70 is illustrated. As discussed above, camera 70 may be mounted rearward of the back end 29b of hood 26, opposite its front end 29a, such that regions which might be blocked to an operator's view may be viewed with camera 70. While obstruction of an operator's field of view in machine 10 may be primarily an issue of vertical obstruction, enclosure 27 may also horizontally limit an operator's field of view. In some instances, it may be difficult or impossible for an operator to view parts of bumper 30, and counterweights 31 positioned thereon, without assistance of a camera. Even in machines where these features are within an operator's field of view, it may be desirable or mandatory to place them within a field of view of camera 70 to provide a reference point so that an operator can assess where machine 10 is located relative to whatever he is viewing on display screen 20. Accordingly, the field of view of camera 70 may span a horizontal viewing angle 12 of approximately 115° degrees, so that it includes portions of counterweights 31 on the corresponding ends of bumper 30. It may also be noted from the FIG. 7 illustration that camera 70 may be placed on a centerline C of machine 10, such that trim piece 40 and, hence, pocket 42 and face 44 are symmetrical about centerline C. The respective features are thus symmetrical about a plane defined by centerline C which is vertically oriented, i.e. edge-on in FIG. 7, and bisects pocket 42. Because of the wide horizontal viewing angle, if the camera 70 were placed off of the centerline C, the operator may have difficulty gauging where an object is in relation to the centerline C of the vehicle.

Figure 8:
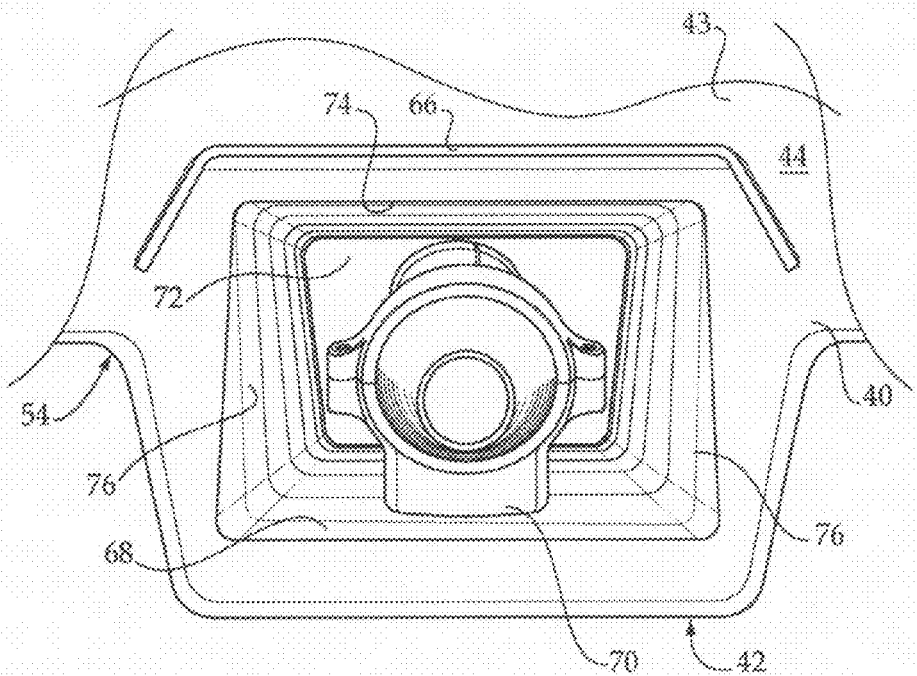
FIG. 8 is a partial front view of a body component according to one embodiment.

Referring to FIG. 8, there is shown in perspective a portion of trim piece 40 illustrating certain of the features of pocket 42 in more detail. As described above, outer surface 43 may be continuous everywhere within its periphery, and may include as sub-parts continuous face 44 and pocket 42. Although multiple-piece versions are possible, the unitary, continuous design illustrated herein is considered to provide a practical implementation strategy. Pocket 42 may include at least one surface which is configured for mounting camera 70 thereon. In one embodiment, the surface whereupon camera 70 is mounted may be a lower surface 68 of pocket 42, which transitions with side surfaces 76, a back surface 72 and an upper surface 74. Pocket 42 may thus at least partially enclose camera 70. The respective surfaces of pocket 42 are thus also part of outer surface 43 and transition with continuous face 44, which at least partially surrounds pocket 42, adjoining pocket 42 on all sides but for lower edge 54.

Figure 9:
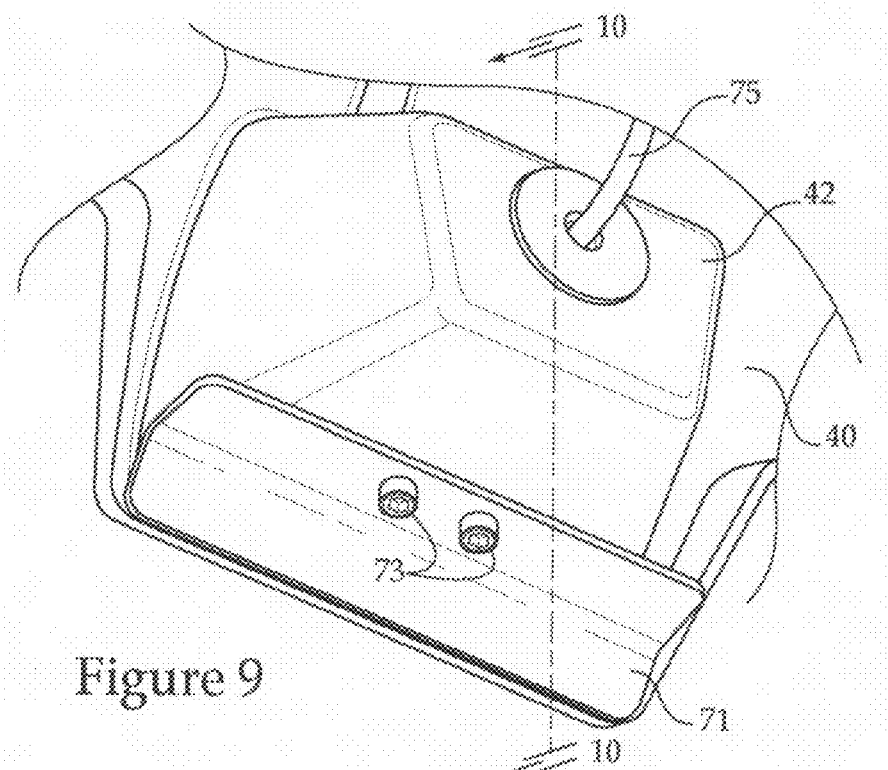
FIG. 9 is a partial bottom view, in perspective, of a body component according to one embodiment.
Figure 10:
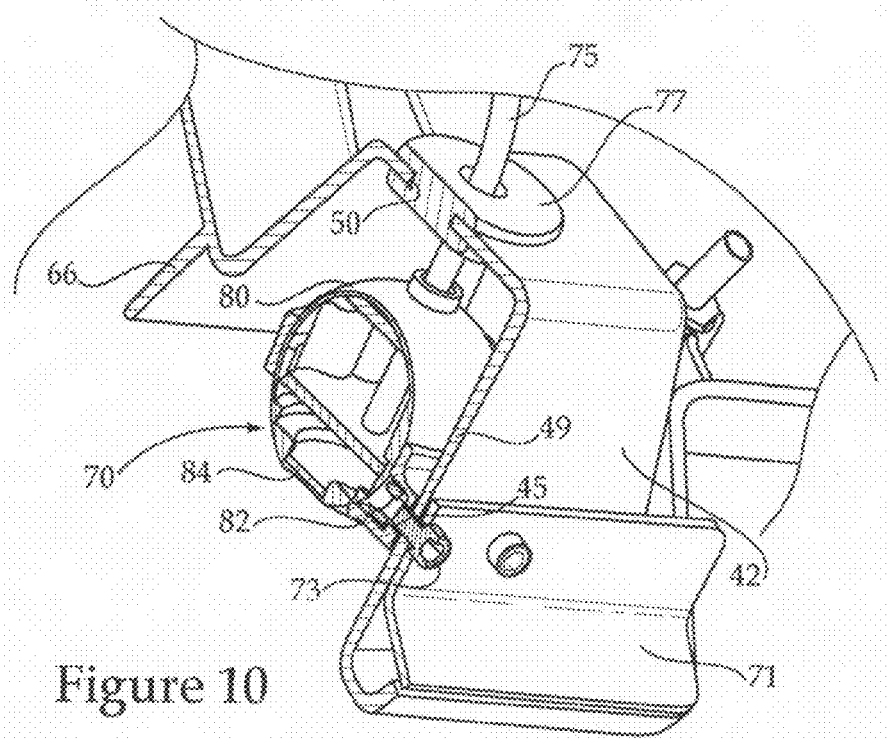
FIG. 10 is a sectioned view, taken along line 10-10 of FIG. 9.

Turning now to FIG. 9, there is shown a portion of trim piece 40 illustrating further aspects of the present disclosure in relation to mounting of camera 70 within pocket 42. A plate 71 may be secured to a bottom of pocket 42 via fasteners 73, for instance conventional bolts, which extend upwardly into an interior of pocket 42. A communication/power line 75 is shown extending from pocket 42 which is configured to supply power to camera 70 when mounted therein, and also serves as a communication link for transmitting data from camera 70 during operation. Referring also to FIG. 10, illustrating a sectioned view taken along line 10-10 of FIG. 9, additional details of mounting camera 70 are shown. One of fasteners 73 is shown extending through a bottom wall 49 of pocket 42, and threadedly coupled with a support pedestal 82 for camera 70 via nuts, for example, or by threads in support pedestal 82 itself. Support pedestal 82 may be attached with or integral with a camera casing 80, within which components such as a camera lens 84 are retained. A plug 77 may also be provided which is fitted within port 50, and has line 75 passing through it.

As evident in FIGS. 9 and 10, mounting of camera 70 within pocket 42 is relatively simple and straightforward. Prior to or after coupling trim piece 40 on machine 10, plate 71 may be positioned appropriately adjacent pocket 42, and fasteners 45 positioned through holes 45. Subsequently, lines 75 may be extended through port 50 and connected with camera 70. Fasteners 73 may then be rotated to engage within threads of support pedestal 82, or other threaded components, to secure camera 70 in place. In certain embodiments, fasteners 73 might also be used to adjust a relative position of camera 70 to obtain a desired view angle and/or orientation of camera 70. In still other embodiments, trim piece 40 and related camera mounting components may be configured such that camera 70 will automatically be positioned at an optimal orientation and location upon installation to ensure compliance with regulations relating to field of view and/or in keeping with design preferences. Provision of port 50 and holes 45 in advance, e.g. by forming them during the molding operation for trim piece 40, is contemplated to provide a relatively quick and simple assembly and mounting process for camera 70.

INDUSTRIAL APPLICABILITY

The described configuration and manufacturing of trim piece 40 provide for a method of assembling a machine such as wheel loader machine 10. The assembly method may include molding a unitary body component such as trim piece 40. As described herein, the term "unitary body component" should be understood to mean that the body component is all one piece, not an assembly such as might be made by coupling a camera mount with an existing body component. As described above, a single sheet of sheet molding compound might be used to mold the unitary body component, of which trim piece 40 is one example, such that its outer surface 43 has a contour specialized for mounting camera 70 thereon and configured to position camera 70 at a desired location and having a desired field of view when coupled to a machine. Thus, when camera 70 is mounted to trim piece 40, it will typically be positioned as needed, without a need to further verify that camera 70 is properly located, although as mentioned above relatively fine adjustments to its position might be made after mounting camera 70 to trim piece 40.

As described, camera 70 may be mounted to a portion of the outer surface of the molded body component, for example, camera mounting surface 68, such that pocket 42 encloses camera 70 but for open end 61. Prior to or after mounting camera 70 to the body component, it may be coupled with a machine frame such as frame 14 of machine 10. A variety of coupling methods are contemplated such as snap-fits, fasteners, adhesives, etc. In any event, however, when coupled with the machine frame, the body component will typically cover a portion of the machine. Once coupled with the machine frame, an electrical link such as a communication link or a power connection may be established between camera 70 and an electrical system of the machine, such as electrical system 24 of machine 10, via port 50 for example. It is contemplated that wireless communication might be used to connect camera 70 with display 20 rather than an actual communication line. Similarly, rather than a power cable, in some embodiments batteries might be used to power camera 70.

In view of the foregoing features, described by way of illustration rather than limitation, trim piece 40 will be understood to provide an improved means of camera mounting for a machine such as wheel loader 10. The unwieldy and unsightly camera mounts of earlier strategies may be dispensed with, as the present disclosure provides a body component already integrally formed to have the features necessary for optimal mounting, positioning and protection of a camera.

The present description is for illustrative purposes only, and should not be construed to narrow the breadth of the disclosure in anyway. Thus, those skilled in the art will appreciate that various modifications might be made to the presently disclosed embodiments without departing from the full and fair scope of the present disclosure. For instance, while much of the foregoing discussion emphasizes the use of camera 70 and trim piece 40 in the context of a single rearview camera mounted at an exterior of a machine, the present disclosure is not strictly limited thereto. Machines are contemplated which have multiple body components having a preexisting outer surface contour for mounting a camera. In such instances, cameras might be mounted at the front, rear and sides of a machine, and an operator could select which camera views he or she wished to have displayed in the cab. Similarly, other body components might be configured as described herein and mounted on a machine to provide an option for later positioning a camera thereon depending upon the machine application. For instance, it might be desirable for a machine configured to use side-mounted implements such as snow wings and the like to have the capability for readily adding a camera if such side-mounted implements are used. Finally, while trim piece 40 might be original equipment, it is also contemplated that trim pieces or other body components configured as set forth herein might be used to retrofit machines previously having no camera, or using inferior camera mounting strategies. Other aspects, features and advantages will be apparent from a review of the attached drawings and appended claims.

We claim:

1. A machine comprising:
   a frame having a plurality of ground engaging elements mounted thereto which are configured for propelling said machine;
   a body mounted to said frame and including a plurality of body components positioned about an enclosure and each configured to cover a portion of said machine; and
   a camera mounted on said machine at a location vertically above said ground engaging elements;
   a vertically extending grill having an outer edge and being configured to permit horizontal airflow into said enclosure;
   wherein one of said body components extends along the outer edge of said grill and includes a contoured outer surface for mounting said camera, said contoured outer surface including a continuous face and a pocket, said pocket at least partially surrounded by and adjoining said continuous face, and wherein said pocket partially encloses said camera and includes at least one camera mounting surface whereupon said camera is mounted.

2. The machine of claim 1 wherein said outer surface further defines an electrical connection port for said camera disposed in said pocket.

3. The machine of claim 2 wherein said continuous face is symmetrical about a plane bisecting said pocket, said pocket having a first end which includes an opening and a second, blind end opposite said first end wherein said electrical connection port is disposed, said at least one camera mounting surface extending from said first end toward said second end of said pocket and transitioning therewith.

4. The machine of claim 3 wherein said plane comprises a first plane and wherein said camera is completely enclosed within said pocket and is disposed on one side of a second plane oriented orthogonal to said first plane, and said second plane being tangent to said outer surface at said opening.

5. The machine of claim 3 wherein said camera comprises a field of view, and wherein the one of said body components is configured for mounting on said machine such that said field of view includes a portion of said machine.

6. The machine of claim 5 comprising a bumper mounted to said frame and having a first end and a second end, wherein the field of view of said camera includes said first and second ends.

7. The machine of claim 5 further comprising an operator cab, said enclosure having a front end proximate said operator cab and a back end opposite said front end, and wherein the one of said body components comprises a unitary molded trim piece configured for mounting at the back end of said enclosure to provide for viewing backward of said enclosure via said camera.

8. The machine of claim 1 wherein the one of said body components comprises a plastic molded trim piece having mounting elements for coupling with said machine, a top edge and a bottom edge, and said pocket extending downwardly from said bottom edge over a portion of said grill such that said pocket is intersected by a line defined by said bottom edge.

9. The machine of claim 8 wherein said outer surface further comprises a visor configured to shield said camera from water dripping down said continuous face under the force of gravity, said visor extending along one side of said opening and extending from said continuous face.

10. A machine comprising:
    a frame having a plurality of ground engaging elements mounted thereto which are configured for propelling said machine;
    a body mounted to said frame and including a plurality of body components each configured to cover a portion of said machine; and
    a camera mounted on said machine;
    wherein one of said body components includes a contoured outer surface for mounting said camera, said contoured outer surface including a continuous face and a pocket, said pocket at least partially surrounded by and adjoining said continuous face, and wherein said pocket partially encloses said camera and includes at least one camera mounting surface whereupon said camera is mounted;
    wherein said outer surface further defines an electrical connection port for said camera disposed in said pocket;
    wherein said continuous face is symmetrical about a plane bisecting said pocket, said pocket having a first end which includes an opening and a second, blind end opposite said first end wherein said electrical connection port is disposed, said at least one camera mounting surface extending from said first end toward said second end of said pocket and transitioning therewith;
    wherein said camera comprises a field of view, and wherein the one of said body components is configured for mounting on said machine such that said field of view includes a portion of said machine;
    the machine further comprising an operator cab, wherein the plurality of body components defines an enclosure separate from said operator cab, said enclosure having a front end proximate said operator cab and a back end opposite said front end, and wherein the one of said body components comprises a unitary molded trim piece configured for mounting at the back end of said enclosure to provide for viewing backward of said enclosure via said camera;
    said plurality of body components includes a hood covering an engine compartment of said machine, said hood including a front top edge and a back top edge;
    said machine further comprises a grill having an upper edge and a lower edge and configured to permit airflow through said grill; and
    said molded trim piece extends along the upper edge of said grill and along the back top edge of said hood and is configured to position said camera such that a portion of said machine is within the field of view of said camera.

11. A machine comprising:
    a frame having a plurality of ground engaging elements mounted thereto which are configured for propelling said machine;
    a body mounted to said frame and including a plurality of body components positioned about an enclosure and each configured to cover a portion of said machine; and
    a camera mounted on said machine;
    wherein one of said body components includes a molded plastic trim piece having a contoured outer surface for mounting said camera, said contoured outer surface including a continuous face and a pocket, said pocket at least partially surrounded by and adjoining said continuous face, and wherein said pocket partially encloses said camera and includes at least one camera mounting surface whereupon said camera is mounted; and
    wherein said machine comprises a wheel loader having a front end and a back end, wherein said enclosure comprises an engine compartment between a operator cab and said back end and wherein said machine further comprises a counterweight coupled with the back end of said machine, and said camera including a field of view and being positioned via said molded trim piece such that said counterweight is within the field of view of said camera.

12. The machine of claim 11 wherein the field of view of said camera includes a first location on a work surface about 1.5 meters from the back end of said machine and a second location about 1.0 meters vertically above said first location, said machine further comprising another field of view from said operator cab which includes a portion of the field of view of said camera but does not include at least one of the first and second locations due to obscuring the at least one of the first and second locations by said hood.

* * * * *